(12) United States Patent
Pink et al.

(10) Patent No.: US 9,823,661 B2
(45) Date of Patent: Nov. 21, 2017

(54) OCCUPANCY GRID MAP FOR A VEHICLE

(71) Applicant: Robert Bosch GmbH, Stuttgart (DE)

(72) Inventors: Oliver Pink, Stuttgart (DE); Carsten Hasberg, Ilsfeld-Auenstein (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/895,364

(22) PCT Filed: Apr. 8, 2014

(86) PCT No.: PCT/EP2014/057033
§ 371 (c)(1),
(2) Date: Dec. 2, 2015

(87) PCT Pub. No.: WO2014/195047
PCT Pub. Date: Dec. 11, 2014

(65) Prior Publication Data
US 2016/0116916 A1 Apr. 28, 2016

(30) Foreign Application Priority Data
Jun. 3, 2013 (DE) .................. 10 2013 210 263

(51) Int. Cl.
G01C 22/00 (2006.01)
G05D 1/00 (2006.01)
G05D 1/02 (2006.01)
G08G 1/16 (2006.01)

(52) U.S. Cl.
CPC ......... *G05D 1/0274* (2013.01); *G05D 1/0088* (2013.01); *G08G 1/16* (2013.01); *G05D 2201/0213* (2013.01)

(58) Field of Classification Search
CPC ............................. G05D 1/0088; G08G 1/16
USPC .......................................................... 701/23
See application file for complete search history.

(56) References Cited

FOREIGN PATENT DOCUMENTS

| DE | 10 2010 011629 | | 1/2011 | |
|----|----|----|----|----|
| DE | 102010011629 | A1 * | 1/2011 | ......... G06K 9/00812 |
| DE | 10 2011 113016 | | 3/2012 | |
| JP | 2010003254 | A | 1/2010 | |
| WO | 2011101988 | A1 | 8/2011 | |

OTHER PUBLICATIONS

International Search Report for PCT/EP2014/057033, dated Jul. 15, 2014.
Burgard, Fox: "Probabilistic Robotics," ISBN-10: 0262201623.

* cited by examiner

*Primary Examiner* — Maceeh Anwari
(74) *Attorney, Agent, or Firm* — Norton Rose Fulbright US LLP; Gerard Messina

(57) ABSTRACT

An occupancy grid map for a vehicle includes several cells disposed in grid-like fashion. The cells of the occupancy grid map are adapted, as a function of a driving situation of the vehicle, to the driving situation. Areas of the cells are configured to be smaller in a region closer to the vehicle, and are configured to be larger in a region further away from the vehicle.

17 Claims, 4 Drawing Sheets

OCCUPANCY GRID MAP FOR A VEHICLE

BACKGROUND OF THE INVENTION

1. Field of the Invention

The present invention relates to an occupancy grid map for a vehicle. The invention furthermore relates to a method for furnishing an occupancy grid map for a vehicle.

2. Description of the Related Art

Automated driving or driving-assistance functions (e.g. ACC, lane change assistant, parking assistant, lane keeping assistant, etc.) for vehicles or automated vehicles, which can be dependent on a representation of the vehicle's environment, are known in the existing art. So-called "occupancy grid maps" (see, for example, Thrun, Burgard, Fox: "Probabilistic Robotics," ISBN-10: 0262201623), whose cells can assume defined states, can be used for this purpose. The individual cells of the occupancy grid map are often oriented in the direction of the longitudinal and transverse axes of the vehicle, and as a rule have edge segments disposed at right angles to one another.

An essential task of the aforesaid occupancy grid map is to describe the vehicle's environment. The vehicle's behavior is planned on the basis of that description, with the result that the vehicle, for example, can react appropriately to other traffic participants. The environment can be represented in a variety of coordinate systems; a representation in Cartesian coordinates or polar coordinates is known.

BRIEF SUMMARY OF THE INVENTION

An object of the invention is to furnish an improved occupancy grid map for a vehicle.

According to a first aspect, the object is achieved with an occupancy grid map for a vehicle exhibiting several cells disposed in grid-like fashion. The occupancy grid map is characterized in that the cells of the occupancy grid map are adapted, as a function of a driving situation of the vehicle, to the driving situation. The result is, advantageously, to furnish an information-optimized representation of the occupancy grid map in which only the information actually required is calculated. In some circumstances a calculation outlay can in fact be reduced as compared with conventional occupancy grid maps. Data are thus made available to a vehicle in a form that is better adapted to the particular driving situation.

According to a second aspect the object is achieved with a method for furnishing an occupancy grid map for a vehicle, having the steps of:

ascertaining a driving situation of the vehicle by way of an ascertainment device; and adapting a configuration of the occupancy grid map as a function of the driving situation.

Preferred embodiments of the occupancy grid map and of the method are the subject matter of dependent claims.

A preferred embodiment of the occupancy grid map according to the present invention is notable for the fact that the cells of the occupancy grid map are disposed in one of the following coordinate systems: Cartesian coordinates, polar coordinates. A mapping behavior of the sensors (e.g. using polar coordinates) can thereby, for example, be adapted in improved fashion to the coordinate system being used. In addition, a calculation of the cells in Cartesian coordinates can advantageously be carried out with little outlay.

A further preferred embodiment of the occupancy grid map according to the present invention is notable for the fact that areas of the cells are configured to be small in a region close to the vehicle, and are configured to be large in a region far from the vehicle. The cell sizes are thereby better adapted to driving situations at higher speed.

A further preferred embodiment of the occupancy grid map is notable for the fact that the cells are adapted, as a function of a speed of the vehicle, to the speed. What advantageously results in this manner is a configuration of the occupancy grid map which is optimally adapted to the particular specific driving situation.

A further preferred embodiment of the occupancy grid map according to the present invention is notable for the fact that when a speed of the vehicle is high the cells are configured to be substantially long in the driving direction and narrow, and when a speed of the vehicle is low they are embodied to be substantially short in the driving direction and wide. This results, advantageously, in a configuration of the cells which is optimally adapted to a real driving situation.

A further preferred embodiment of the occupancy grid map according to the present invention is notable for the fact that areas of the cells are embodied to be large when a speed of the vehicle is high, and are embodied to be small when a speed of the vehicle is low. The result, advantageously, is that an information demand is adapted, depending on a driving situation, to the driving situation, consideration being given to the fact that demand for information from the occupancy grid map depends on the current speed situation of the vehicle.

A further preferred embodiment of the occupancy grid map according to the present invention is notable for the fact that the cells are adapted to drivable maneuvers of the vehicle. A usability of the occupancy grid map can thereby be considerably increased, since unnecessary information in the form of environment data is not even acquired or generated.

A further preferred embodiment of the occupancy grid map according to the present invention is notable for the fact that the cells are adapted to a road trajectory for the vehicle. Because a driving situation is also partly defined by a road trajectory, the occupancy grid map is thereby advantageously furnished in a manner in which the vehicle can derive optimum benefit from the occupancy grid map.

A further preferred embodiment of the occupancy grid map according to the present invention is notable for the fact that a number of cells of the occupancy grid map is constant. The advantageous result is that a calculation outlay or memory outlay for ascertaining the occupancy grid map always remains substantially constant irrespective of the adaptation processes, and can thereby be better planned.

A further preferred embodiment of the occupancy grid map according to the present invention is notable for the fact that the occupancy grid map exhibits a high cell density in regions of interest that depend on the driving situation. The result is that a data inventory of the occupancy grid map is focused onto those regions in which an elevated information demand exists based on the specific driving situation.

An advantageous refinement of the method according to the present invention provides that a ascertainment of a sensing characteristic for a sensor device of the vehicle is carried out based on the occupancy grid map. The result is that in a process of developing a sensor device, the sensing characteristics or operating properties thereof can be adapted to conditions in the vehicle on the basis of a variety of driving states.

The invention will be described in detail below, with further features and advantages, with reference to several Figures.

DETAILED DESCRIPTION OF THE INVENTION

Figure 1:
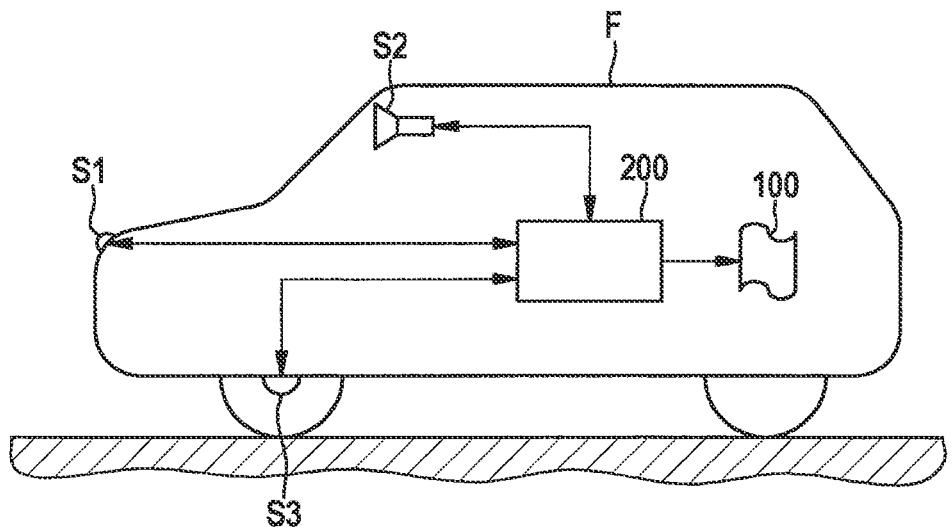
FIG. 1 shows a vehicle having an ascertainment device for ascertaining the occupancy grid map according to the present invention.

FIG. 1 schematically depicts a vehicle F in which an ascertainment device 200 for furnishing occupancy grid map 100 according to the present invention is disposed. Several sensor devices S1, S2, S3 known per se (e.g. radar sensor, ultrasonic sensor, wheel rotation speed transducer, camera, etc.) convey their data regarding a vehicle environment to ascertainment device 200, which is provided in order to ascertain occupancy grid map 100. Ascertainment device 200 can be provided as a separate electronic vehicle control unit or can be integrated into an already existing electronic control unit (e.g. an ACC control unit). Provision can advantageously be made, by way of a back channel of ascertainment device 200 to the individual sensor devices S1, S2, S3, that occupancy grid map 100 which is prepared is used to modify a sensing characteristic of sensor apparatuses S1, S2, S3 in order to adapt optimally to a driving situation of vehicle F. The aforesaid data can furthermore also be used to design a sensor configuration.

Figure 2A:
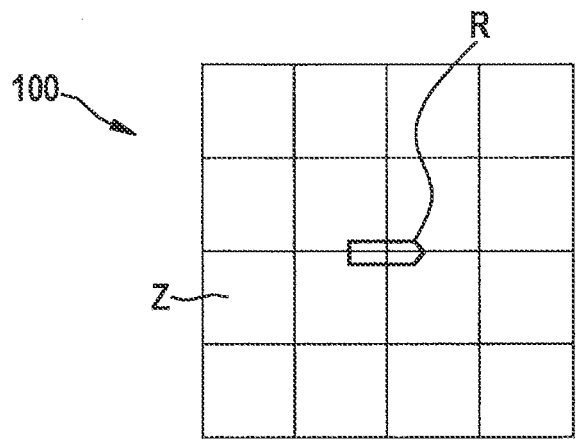
FIG. 2a shows a conventional occupancy grid map for a vehicle, in Cartesian coordinates.

FIG. 2a shows a conventional occupancy grid map 100 having individual cells Z having a fixed size and predefined geometry, cells Z being disposed in a Cartesian coordinate system. Each of the cells can assume, expressed in simplified fashion, two different states ("occupied" or "vacant"), corresponding to a degree of travelability of the respective cell Z. The aforesaid states can additionally be associated with a probability value. An arrow at the center of occupancy grid map 100 is intended to indicate a driving direction R of vehicle F.

Provision is made according to the present invention that occupancy grid map 100 is adapted to the respectively current driving situation of vehicle F by way of a suitable configuration and disposition of the individual cells Z of occupancy grid map 100. Provision can be made for this purpose, for example, that a larger number of cells Z of occupancy grid map 100 are located in regions in which highly accurate environment sensing is necessary for a given driving situation, while fewer cells Z are used in so-called "uninteresting" regions. This principle can be referred to as "attention steering." An adaptation of a cell size can depend on one or more of the following parameters: distance of an object, current speed, road trajectory, drivable maneuver, etc.

Figure 2B:
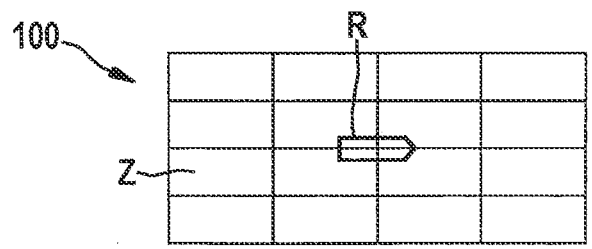
FIG. 2b shows an embodiment of an occupancy grid map according to the present invention for a vehicle, in Cartesian coordinates.

It is evident in FIG. 2b, in which a higher driving speed of vehicle F than in FIG. 2a is assumed, that cells Z are now "stretched" in the driving direction of vehicle F and "shortened" transversely to the driving direction. The result is that the predictive range becomes greater for faster driving; for that purpose, occupancy grid map 100 used as a basis is stretched, i.e. extended in a longitudinal direction and, optionally, simultaneously compressed in a transverse direction.

Lateral dimensions of cells Z are embodied to be preferably approximately in the centimeter range in the region close to vehicle F (i.e. at a distance of approximately a few meters from vehicle F), and preferably approximately in the meter range in the region far from the vehicle (i.e. at a distance on the order of approx. more than 100 m from vehicle F). This means that at a high driving speed, cells Z can be embodied to be "long and narrow," a cell length being preferably in a range from approx. 1 m to approx. 2 m, and a cell width in a range from approx. 50 cm to approx. 1 m.

With slow driving, conversely (i.e. in driving situations in which the maneuvering capability of the vehicle should be high, for example at intersections, when parking, etc., for example at a speed between approx. 5 km/h and approx. 20 km/h), a long predictive range as a rule is not necessary, so that the conformation of occupancy grid map 100 can be substantially "short and wide." This can result, for example, from a longitudinal dimension of cells Z in a range from approx. 10 cm to approx. 30 cm, and from a width dimension of cells Z in a range from approx. 10 cm to approx. 30 cm. Alternatively, however, in this case dimensions of cells Z in the longitudinal and transverse directions can also be approximately the same, which means that exemplifying configurations of cells Z in the close region can be preferably on the order of approx. 10 cm×approx. 10 cm, and in the far region on the order of approx. 1 m×approx. 1 m.

This takes into account the circumstance that the driving situation existing for vehicle F at high speed (e.g. driving on a main road or an expressway with good visibility and road conditions and in moderate traffic with no stoppages, i.e. in a speed range between approx. 80 km/h and approx. 160 km/h) is one in which lateral detection accuracy is not particularly relevant, whereas a predictive range or predictive detection accuracy should be large. It is furthermore evident that a total number of cells Z in occupancy grid map 100 of FIG. 2b adapted according to the present invention has remained the same as compared with the conventional occupancy grid map 100 of FIG. 2a. This means that a calculation outlay or memory outlay for creating occupancy grid map 100 remains the same, and is adapted or optimized according to the present invention to the specific driving situation.

The above quantitative examples in conjunction with FIGS. 2a and 2b, for example the quantitative examples for the close region, far region, cell width, cell length, speed ranges, apply generally and in particular to all embodiments disclosed in the description, and are thus not restricted only to the embodiments described in conjunction with FIGS. 2a and 2b.

Figure 3A:
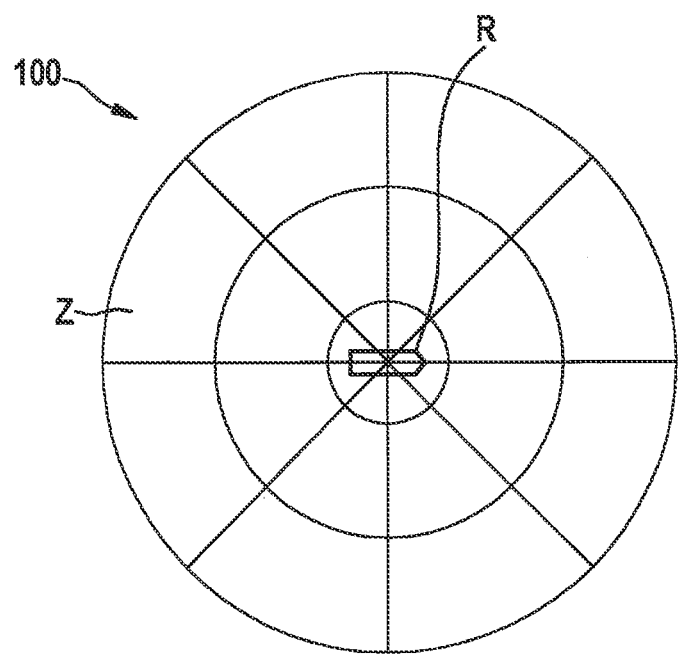
FIG. 3a shows a conventional occupancy grid map for a vehicle, in polar coordinates.
Figure 3B:
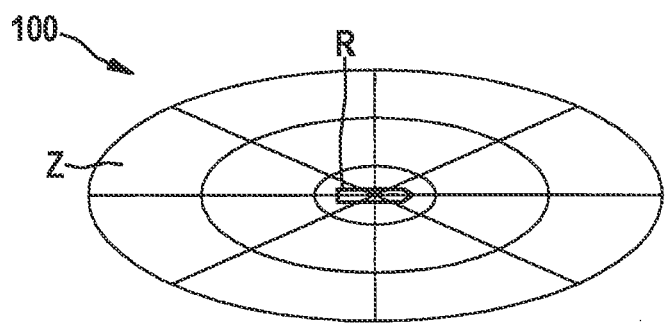
FIG. 3b shows a further embodiment of the occupancy grid map according to the present invention for a vehicle, in polar coordinates.

FIG. 3a shows a conventional occupancy grid map 100 whose cells Z are disposed in polar coordinates. A higher driving speed for vehicle F exists in FIG. 3b than in FIG. 3a. It is evident that occupancy grid map 100 is now stretched, similarly to the case in FIG. 2b, so that a kind of elliptical coordinate system is produced which once again is elongated in driving direction R and compressed transversely to driving direction R. A faster driving state of vehicle F can thereby be dealt with more appropriately, with no calculation outlay for environment sensing transversely to the driving direction of vehicle F.

Figure 4:
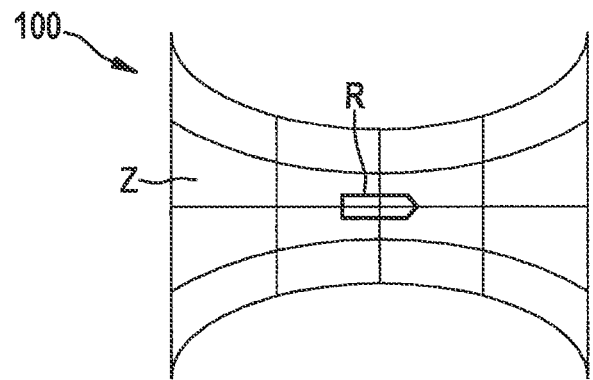
FIG. 4 shows a further embodiment of the occupancy grid map according to the present invention for a vehicle, in Cartesian coordinates.

FIG. 4 shows a further embodiment of occupancy grid map 100 according to the present invention. In this variant, provision is made that occupancy grid map 100 takes into account the speed of vehicle F and is adapted to a technically or physically drivable maneuver of vehicle F. This yields an occupancy grid map 100 in a curved coordinate system having Cartesian coordinates whose curvatures become flatter, the higher the speed of vehicle F. This takes into account the circumstance that the vehicle environment alongside vehicle F often needs to be known only in the close region, since there is in any case almost no possibility of, or provision for, movement in a transverse direction at high speed. In this case occupancy grid map 100 is, so to speak, "constricted" in the close region as a function of speed.

The resolution of occupancy grid map 100 can likewise be varied with increasing distance from vehicle F, for example logarithmically (this means high accuracy in the close region and low accuracy at a distance) or inversely proportionally to distance (e.g. based on a sensor principle whose distance resolution is inversely proportional to distance).

Figure 5:
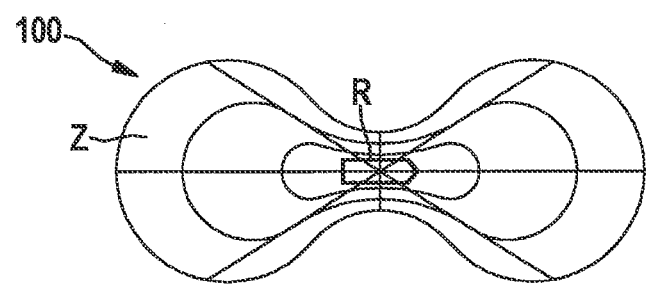
FIG. 5 shows a further embodiment of the occupancy grid map according to the present invention for a vehicle.

FIG. 5 shows a further variant of an occupancy grid map 100, this time in polar coordinates, adapted to drivable maneuvers.

Figure 6:
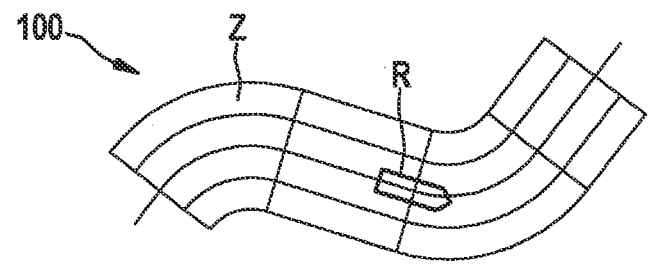
FIG. 6 shows a further embodiment of the occupancy grid map according to the present invention for a vehicle.

FIG. 6 shows a further variant of occupancy grid map 100 in which provision is additionally made that a road trajectory or a planned vehicle maneuver of vehicle F can be incorporated in order to identify a suitable geometric model for occupancy grid map 100. For example, if it is known based on the road trajectory or based on a planned turning maneuver that vehicle F will soon drive to the right, higher accuracy can be provided in this target region. This can be achieved, for example, by disposing cells Z along the planned maneuver or along the road trajectory.

Instead of a two-dimensional occupancy grid map 100, the method according to the present invention can also be applied to three-dimensional occupancy grid maps, in which context the accuracy can also be adapted, for example, to an elevation profile of the route.

Figure 7:
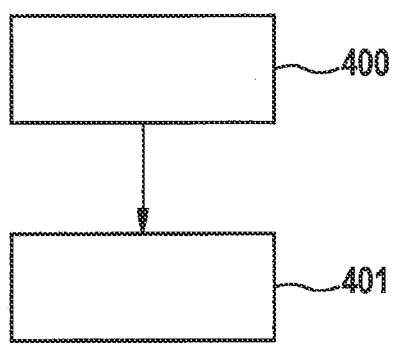
FIG. 7 schematically depicts a sequence of an embodiment of the method according to the present invention.

FIG. 7 shows a schematic sequence of an embodiment of the method according to the present invention. In a first step 400, a driving situation of vehicle F is ascertained by way of an ascertainment device 200.

In a step 401, a configuration of occupancy grid map 100 is adapted as a function of the driving situation.

In summary, with the present invention an improved description of a vehicle environment is achieved thanks to adaptation of an occupancy grid map to a current driving state of the vehicle. Various information items can be employed for ascertaining the driving state. These can be, among others, one or more of the following information items:

current driving speed;
restrictions on possible vehicle movements due to kinematics of the vehicle and maneuvers that are feasible in terms of driving dynamics (e.g. Kamm's circle);
accuracy of the sensors used (e.g. less accurate measurements at a distance);
future road trajectory, derived e.g. from a digital map;
regions of the vehicle environment that are of interest for a planned driving maneuver.

The fact that as compared with a conventional occupancy grid map having a predefined cell size and cell disposition, the occupancy grid map according to the present invention always exhibits high accuracy only in regions of interest, which can considerably reduce outlay for calculation and memory, is regarded as a particular advantage of the present invention. For example, a constant maximum number of cells (and thus a maximum memory outlay) can be defined, these always being distributed so that the greatest density of cells is located in the regions of interest. When optimum coverage of the sensing region is achieved, a reduction in computing performance can in fact be achieved by way of the optimization according to the present invention.

The occupancy grid map according to the present invention can also be regarded as a method for describing a required accuracy of an environment sensing function, since it encompasses models with which it is possible to identify, for various driving situations, the regions in which higher accuracy is necessary.

Although the present invention has been described with reference to preferred embodiments, it is in no way limited thereto.

One skilled in the art will thus correspondingly modify and combine the features without deviating from the essence of the invention.

What is claimed is:

1. A system for controlling a vehicle, comprising:
at least one sensor; and
a processor, wherein the processor is configured to:
obtain information, the information including at least one of a characterization of a present movement of the vehicle, a restriction on possible movements of the vehicle based on a current state of the vehicle, an upcoming road trajectory of a road on which the vehicle is traveling, and an upcoming driving maneuver of the vehicle;
based on the at least one of the characterization of the present movement of the vehicle, the restriction on possible movements of the vehicle based on the current state of the vehicle, the upcoming road trajectory of the road on which the vehicle is traveling, and the upcoming driving maneuver of the vehicle, select at least one of a size and shape of each of a plurality of cells disposed in grid-like fashion in an occupancy grid map, wherein the selecting is performed by executing an algorithm that controls the processor such that, for different contents of the information, the plurality of cells are differently configured;
obtain, from the at least one sensor, sensor information identifying one or more objects in a surrounding area of the vehicle;
apply to the area the occupancy grid map including the cells, the at least one of the size and shape of which have been selected, so that the identified one or more objects are thereby associated with one or more corresponding ones of the cells;
based on an identification of the one or more cells of the occupancy grid map that are associated with the identified one or more objects, determine a vehicle control to be performed; and
based on the determination of the vehicle control, provide an output for performance of the determined vehicle control.

2. The system as recited in claim 1, wherein the cells of the occupancy grid map are disposed in a Cartesian coordinate system.

3. The system as recited in claim 1, wherein areas of the cells are configured to be smaller in a region closer to the vehicle in comparison to area of the cells in a region further away from the vehicle.

4. The system as recited in claim 1, wherein the selection of the at least one of the size and the shape of the cells is performed based on a speed of the vehicle.

5. The system as recited in claim 4, wherein the cells are adapted to be (i) substantially elongated in the driving direction and narrow when the speed of the vehicle is higher than a predetermined threshold value, and (ii) substantially short in the driving direction and wide when a speed of the vehicle is lower than a predetermined threshold value.

6. The system as recited in claim 1, wherein areas of the cells are (i) adapted to be larger when the speed of the vehicle is increased, and (ii) adapted to be smaller when the speed of the vehicle is decreased.

7. The system as recited in claim 6, wherein the cells are adapted based on maneuvers of the vehicle which are physically possible.

8. The system as recited in claim 6, wherein the cells are adapted to a road trajectory for the vehicle.

9. The system as recited in claim 6, wherein a number of cells of the occupancy grid map is constant.

10. The system as recited in claim 1, wherein the occupancy grid map exhibits a high cell density in selected regions of interest which depend on the driving situation.

11. The system as recited in claim 1, wherein the selection of the at least one of the size and shape for each of the plurality of cells is performed based on a speed of the vehicle.

12. The system as recited in claim 1, wherein the selection of the at least one of the size and shape for each of the plurality of cells is performed based on a restriction on vehicle maneuvers determined by the processor based on current vehicle driving dynamics.

13. The system as recited in claim 1, wherein the selection of the at least one of the size and shape for each of the plurality of cells is performed based on the upcoming road trajectory of a road on which the vehicle is traveling.

14. The system as recited in claim 1, wherein the selection is of the shape.

15. The system as recited in claim 1, wherein the cells of the occupancy grid map are disposed in a polar coordinate system.

16. A method for controlling a vehicle, comprising:
obtaining, by a processor, information, the information including at least one of a characterization of a present movement of the vehicle, a restriction on possible movements of the vehicle based on a current state of the vehicle, an upcoming road trajectory of a road on which the vehicle is traveling, and an upcoming driving maneuver of the vehicle;
based on the at least one of the characterization of the present movement of the vehicle, the restriction on possible movements of the vehicle based on the current state of the vehicle, the upcoming road trajectory of the road on which the vehicle is traveling, and the upcoming driving maneuver of the vehicle, selecting, by the processor, at least one of a size and shape of each of a plurality of cells disposed in grid-like fashion in an occupancy grid map, wherein the selecting is performed by executing an algorithm that controls the processor such that, for different contents of the information, the plurality of cells are differently configured;
obtaining, by the processor, sensor information identifying one or more objects in a surrounding area of the vehicle;
applying, by the processor and to the area, the occupancy grid map including the cells, the at least one of the size and shape of which have been selected, so that the identified one or more objects are thereby associated with one or more corresponding ones of the cells;
based on an identification of the one or more cells of the occupancy grid map that are associated with the identified one or more objects, determining, by the processor, a vehicle control to be performed; and
based on the determination of the vehicle control, providing, by the processor, an output for performance of the determined vehicle control.

17. A non-transitory, computer-readable data storage medium storing a computer program having program codes which, when executed on a computer, perform a method for controlling a vehicle, the method comprising:
obtaining information, the information including at least one of a characterization of a present movement of the vehicle, a restriction on possible movements of the vehicle based on a current state of the vehicle, an upcoming road trajectory of a road on which the vehicle is traveling, and an upcoming driving maneuver of the vehicle;
based on the at least one of the characterization of the present movement of the vehicle, the restriction on possible movements of the vehicle based on the current state of the vehicle, the upcoming road trajectory of the road on which the vehicle is traveling, and the upcoming driving maneuver of the vehicle, selecting at least one of a size and shape of each of a plurality of cells disposed in grid-like fashion in an occupancy grid map, wherein the selecting is performed by executing an algorithm that controls the processor such that, for different contents of the information, the plurality of cells are differently configured;
obtaining sensor information identifying one or more objects in a surrounding area of the vehicle;
applying to the area the occupancy grid map including the cells, the at least one of the size and shape of which have been selected, so that the identified one or more objects are thereby associated with one or more corresponding ones of the cells;
based on an identification of the one or more cells of the occupancy grid map that are associated with the identified one or more objects, determining a vehicle control to be performed; and
based on the determination of the vehicle control, providing an output for performance of the determined vehicle control.

* * * * *